US012322839B2

(12) United States Patent
Panozzo et al.

(10) Patent No.: US 12,322,839 B2
(45) Date of Patent: Jun. 3, 2025

(54) BONDING METHOD WHICH CAN BE APPLIED TO FUEL CELLS

(71) Applicant: SYMBIO, Venissieux (FR)

(72) Inventors: Régis Panozzo, Vieux-Charmont (FR); Claire Romand, Belfort (FR)

(73) Assignee: SYMBIO, Fontaine (FR)

( * ) Notice: Subject to any disclaimer, the term of this patent is extended or adjusted under 35 U.S.C. 154(b) by 952 days.

(21) Appl. No.: 17/433,310

(22) PCT Filed: Feb. 25, 2020

(86) PCT No.: PCT/FR2020/050357
§ 371 (c)(1),
(2) Date: Aug. 24, 2021

(87) PCT Pub. No.: WO2020/174175
PCT Pub. Date: Sep. 3, 2020

(65) Prior Publication Data
US 2022/0149394 A1   May 12, 2022

(30) Foreign Application Priority Data
Feb. 26, 2019   (FR) ...................................... 1901963

(51) Int. Cl.
H01M 8/0286   (2016.01)
C09J 5/00   (2006.01)
H01M 8/2404   (2016.01)

(52) U.S. Cl.
CPC ............. *H01M 8/0286* (2013.01); *C09J 5/00* (2013.01); *H01M 8/2404* (2016.02); *C09J 2203/33* (2013.01)

(58) Field of Classification Search
CPC ............. H01M 8/0286; H01M 8/0297; H01M 8/0271; H01M 8/2404; C09J 2203/33
See application file for complete search history.

(56) References Cited

U.S. PATENT DOCUMENTS 6,447,631 B1 * 9/2002 Schahl ....................... C09J 5/04
156/310
8,974,982 B2   3/2015 Tanahashi et al.
2009/0214917 A1   8/2009 Tanahashi et al.
(Continued)

OTHER PUBLICATIONS

International Search Report for PCT/FR2020/050357 dated May 29, 2020.
Preliminary Search Report for FR 1901963 dated Jan. 17, 2020.

Primary Examiner — Christopher P Domone
(74) Attorney, Agent, or Firm — B. Aaron Schulman, Esq.; Stites & Harbison, PLLC

(57) ABSTRACT

A method for bonding a first component (1) with a second component (2), comprising the following steps: —depositing on the first component (1) and/or the second component (2) an adhesive means of a first type, selected from a slow-setting adhesive means (3) or a quick-setting adhesive means (4), —depositing on the first component (1) and/or on the second component (2), an adhesive means of a second type different from the first type, selected from a slow-setting adhesive means (3) or a quick-setting adhesive means (4), —bringing the two components (1,2) into contact, —pressing and—setting the slow-setting adhesive means (3), with application to the assembly of a bipolar plate (6) and to the assembly of a fuel cell (7).

6 Claims, 7 Drawing Sheets

(56) References Cited

U.S. PATENT DOCUMENTS

2011/0281195 A1 11/2011 Fuller et al.
2017/0226392 A1* 8/2017 Luong ................. H01M 8/1004
2017/0334168 A1* 11/2017 Dry ........................ B32B 15/04
2019/0330496 A1 10/2019 Fukushi et al.

* cited by examiner

BONDING METHOD WHICH CAN BE APPLIED TO FUEL CELLS

The present invention relates to the field of fuel cells, and more particularly to a bonding method applicable to the assembly of the various constituent plates of such a fuel cell.

PRIOR ART

A hydrogen fuel cell or fuel cell of the Proton Exchange Membrane Fuel Cell (PEMFC) type allows, in a known manner, the production of electrical energy by carrying out a chemical reaction for the synthesis of water by means of a membrane-electrode assembly, comprising an electrolyte surrounded by two layers of catalyst. Hydrogen $H_2$ is brought to an anode, located on one side of the membrane. It decomposes, by oxidation: $2\ H_2 \rightarrow 4\ H^+ + 4\ e^-$, into two hydrogen protons $H^+$ and two electrons $e^-$. The two $H^+$ protons migrate through the membrane electrode assembly to a cathode, located on the other side of the membrane electrode assembly. Oxygen $O_2$ is supplied, advantageously in the form of air, to the cathode. If an electrical circuit is established between the anode and the cathode, allowing a flow of $e^-$ electrons, they reach the cathode. There, they allow a reduction of oxygen $O_2$ into two oxygen ions $O^{2-}$: $O_2 + 4\ e \rightarrow 2\ O^{2-}$. The hydrogen protons and oxygen ions combine, at the cathode, to form water: $4\ H^+ + 2\ O^{2-} \rightarrow 2\ H_2O$. This reaction is strongly exothermic. The circulation of electrons e– creates electrical energy.

It is known to realize a fuel cell to superimpose an anode, advantageously metallic, a membrane electrode assembly and a cathode, advantageously metallic, advantageously in the form of thin layers.

Since a cell individually produces only a small amount of electrical energy, it is known to superimpose several tens or hundreds of such cells in a stack. Each anode, respectively cathode, of a cell is then in electrical contact with the cathode, respectively anode, of the next, respectively previous cell. The cells are connected in series. The electrical circuit then connects the first anode/cathode with the last cathode/anode of the stack.

An anode, respectively cathode, respectively membrane electrode assembly is integrated into an anode plate, respectively cathode plate, respectively membrane plate. A plate comprises its element: anode or cathode or membrane electrode assembly, completed by assembly elements, as well as channels for the supply of reactive gases or the outlet of reaction products.

Thus, all types of plates: anode, cathode, bipolar or membrane, present a similar shape or at least can be stacked. All the plates are pierced by at least one superimposed and facing opening so as to form at least one hydrogen-carrying channel in order to bring this gas to the anodes. All the plates are pierced with at least one superimposed and facing opening so as to form at least one channel carrying air so as to bring oxygen to the cathodes and extract the water produced by the chemical reaction. All the plates are also pierced by at least one superimposed and facing opening so as to form at least one channel in which a cooling fluid circulates in order to evacuate the substantial heat produced by the chemical reaction.

It is also known to pre-assemble an anode plate and a cathode plate back-to-back, to obtain a bipolar plate. A battery can then be assembled by periodically stacking a bipolar plate and a membrane plate. If all the bipolar plates are arranged in the same direction, the periodic sequence is the same: anode, membrane electrode assembly, cathode, anode, etc. Only the two ends of the cell differ in that they have a single anode or cathode as well as means of connection to the various reactive gases and cooling fluid.

In order to create the different channels: hydrogen, air, cooling fluid, it is necessary to create gas and/or liquid seals between the different plates.

According to the prior art, the assembly and the seals between an anode plate and an adjacent cathode plate, at the interface between two adjacent cells, or between the two metal plates constituting a bipolar plate, are carried out by continuous seam welding, for example by laser. Such a method requires a significant amount of time, of the order of 30 seconds, to assemble an anode plate and a cathode plate and produce a bipolar plate. This time multiplied by the tens or hundreds of bipolar plates needed to produce a fuel cell is not really compatible with an industrial production. Therefore, an alternative and quicker embodiment for the assembly and sealing of a bipolar plate is sought.

According to the prior art, the sealing between an anode plate, respectively cathode, and a membrane plate is achieved by means of a silicone gasket. This interface can also advantageously benefit from the alternative embodiment according to the invention.

SUMMARY OF THE INVENTION

The principle of the invention consists in replacing the welding or the sealing which must be carried out plate by plate by a bonding which can advantageously be carried out simultaneously for all the plates. However, in order to obtain a bond that guarantees a long life compatible with the life of a fuel cell, it is necessary to use an adhesive medium that has the disadvantage of being slow setting. Such a slow-setting adhesive does not guarantee the relative positioning of the plates during the assembly operations to form a fuel cell. The main idea of the invention is to use a quick-setting adhesive in conjunction with a slow-setting adhesive. Thus, the quick-setting adhesive means ensures immediate assembly of the bonded components, and at least during the time required for the slow-setting adhesive means to dry/set.

For example, a quick-setting adhesive, whether under stress or not, can be understood as setting in less than 10 seconds, preferably less than 5 seconds and even more preferably less than 1 second. A slow-setting adhesive means one that sets between 30 seconds and 24 hours, preferably between 30 seconds and 1 hour, even more preferably between 5 and 15 minutes, even more preferably between 30 seconds and 15 minutes and even more preferably between 30 seconds and 1 minute.

More particularly, the slow-setting adhesive means may be configured to have a setting time of 30 seconds or more and the quick-setting adhesive means may be configured to have a setting time of 10 seconds or less. Quick and/or slow setting is defined as setting under stress or not.

The invention relates to a method for bonding a first component with a second component, comprising the following steps: —applying to the first component and/or to the second component an adhesive means of a first type, from among a slow-setting adhesive means or a quick-setting adhesive means, —applying to the first component and/or to the second component an adhesive means of a second type, different from the first type, from among a slow-setting adhesive means or a quick-setting adhesive means, —bringing the two components into contact, —pressing, and— setting the slow-setting adhesive means.

The bonding method comprises the step of depositing a slow-setting adhesive and a quick-setting adhesive means
wherein
the slow setting adhesive means is configured to have a slower setting than a quick setting of the quick-setting adhesive means.

In other words, at a first given point in time during the bonding method, the quick-setting adhesive means has set or dried while the slow-setting means has not yet set or dried. Accordingly, at this first given point in time, the quick-setting adhesive means ensures the attachment while the slow-setting adhesive means is still setting. At a second point in time later than the first point in time, both the quick-setting adhesive means and the slow-setting adhesive means will have set or dried and therefore are both providing attachment.

Advantageously, the bonding method comprises the step of depositing:
a slow-setting adhesive means and
a quick-setting adhesive means
wherein
the slow-setting adhesive means is configured to have a slower setting than a quick setting of the quick-setting adhesive means and
the slow setting adhesive means is configured to have a setting time of 30 seconds or more and the quick-setting adhesive means is configured to have a setting time of 10 seconds or less.

Alternatively, it is possible to use
a quick-setting adhesive means that is configured to set in less than 10 seconds, preferably less than 5 seconds and even more preferably less than 1 second
in combination with
a slow-setting adhesive means which is configured to have a setting time of between 30 seconds and 24 hours, preferably between 30 seconds and 1 hour, even more preferably between 5 and 15 minutes, even more preferably between 30 seconds and 15 minutes and even more preferably between 30 seconds and 1 minute.

More particularly, the method of bonding a first component with a second component may comprise the following steps:
applying a slow-setting adhesive means to the first component and/or the second component, and
applying a quick-setting adhesive means to the first component and/or the second component.

Particular features or embodiments, usable alone or in combination, are:
the slow-setting adhesive means is deposited in at least one continuous, closed contour,
the slow-setting adhesive means comprises a slow-setting adhesive and/or a surface support coated on both sides with a slow-setting adhesive, the slow-setting adhesive preferably being of the thermally drying polymer type
the quick-setting adhesive means is deposited according to at least two points
the quick-setting adhesive means is of the press-activated, instant-setting type, The invention also relates to an assembly obtained by means of such a bonding method.

The invention further relates to a method of assembling a bipolar plate for a fuel cell, comprising an anode plate and a cathode plate, which are substantially superposable, and applying such a bonding method to assemble the anode plate with the cathode plate.

Particular features or embodiments, usable alone or in combination, are:

the anode plate and the cathode plate are pierced with opposing openings, so as to form through-going gaseous reagent channels, and the slow-setting adhesive means is deposited in a continuous, closed contour surrounding each of the openings and in a continuous, closed contour at the periphery of the plates.

The invention further relates to a bipolar plate obtained by means of such an assembly method.

The invention further relates to a method of assembling a fuel cell, comprising a stack periodically alternating a bipolar plate and a membrane plate, the bipolar plates all being oriented in the same direction, applying such a bonding method to assemble a bipolar plate with a membrane plate.

Particular features or embodiments, usable alone or in combination, are:
a bipolar plate and a membrane plate are pierced with opposing openings, so as to form gaseous reactant channels and at least one cooling fluid channel therethrough, and the slow-setting adhesive means is deposited according to a continuous, closed contour surrounding each of the openings and in a continuous, closed contour at the periphery of the plates.

The invention further relates to a fuel cell obtained by means of such an assembly method.

BRIEF DESCRIPTION OF THE DRAWINGS

The invention will be better understood upon reading the following description, made only by way of example, and with reference to the appended figures in which.

DESCRIPTION OF THE EMBODIMENTS

Figure 1:
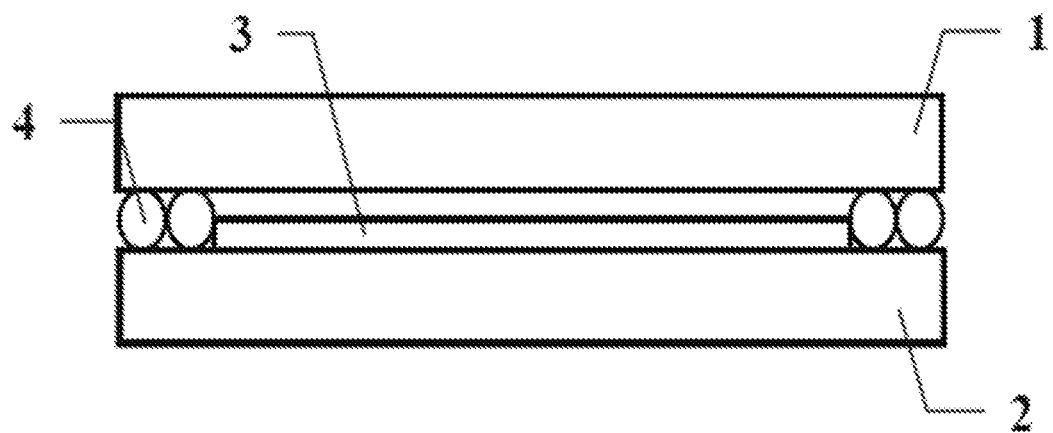
FIGS. 1 and 2 represent, in profile view, a bonding between two elements, respectively during contact and after pressing.

With reference to FIG. 1, a method of bonding a first component 1 with a second component 2 is illustrated. To achieve this bonding, a slow-setting adhesive means 3 is applied to the first component 1. The slow-setting adhesive 3 can also be applied to the second component 2. Alternatively, it is possible to double up, with part of the slow-setting adhesive 3 being applied to the first component 1 and part of the slow-setting adhesive 3 being applied to the second component 2. A slow-setting adhesive 3 is durable but has the disadvantage of requiring a setting time during which the assembly of the two components 1, 2 cannot be moved without the risk of relative movement.

To overcome this disadvantage, a quick-setting adhesive 4 is applied to the first component 1. The quick-setting adhesive 4 can also be applied to the second component 2. Alternatively, it is possible to double up, with part of the quick-setting adhesive 4 being applied to the first component 1 and part of the quick-setting adhesive 4 being applied to the second component 2. The quick-setting adhesive 4 ensures that the first component 1 is immobilized relative to the second component 2 at least until the slow-setting adhesive 3 sets, thus allowing the assembly to be moved more quickly. The different applications of slow-setting adhesive 3 and quick-setting adhesive 4 can be carried out in any sequence or even, at least partially, simultaneously.

Figure 2:
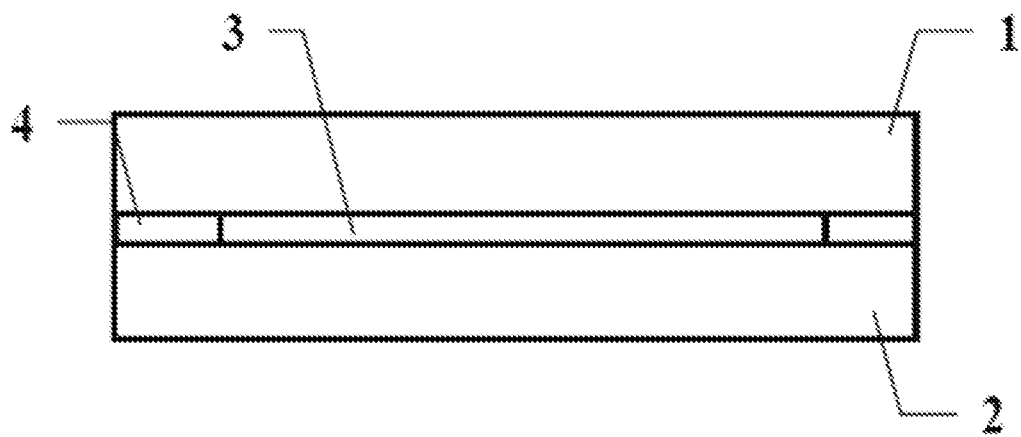

Once all the adhesive applications have been made, the bonding method continues with the two components 1, 2 being brought into contact with each other with the adhesive deposits 3, 4 facing each other, followed by pressing the two components 1, 2 towards each other. Thus, the two components 1, 2 are fixed to each other by the quick-setting adhesive means 4, and the slow-setting adhesive means 3 can then set. FIG. 2 shows the result of the bonding after pressing.

The primary purpose of the slow-setting adhesive means 3 is to bond the component 1 to the component 2. Advantageously, it can also be used to provide a seal between the two components 1, 2. Also according to another characteristic, the slow-setting adhesive means 3 is deposited along at least one continuous contour. This continuous contour is advantageously closed in a loop, so that it can surround an opening to be sealed.

According to another feature, the slow-setting adhesive means 3 comprises a slow-setting adhesive. Alternatively or additionally, it comprises a double-sided adhesive, i.e. a surface support coated on both sides with a slow-setting adhesive.

In all cases, the slow-setting adhesive can be a solid, liquid or paste, applied by brush, syringe, silk-screen printing, transfer, spray or any other means. The slow-setting adhesive is preferably of the polymer type. This polymer adhesive is advantageously of the thermal setting type. Thus, once the two components 1, 2 are in place against each other, heating, for example by steaming, allows the slow-setting adhesive means 2 to set. Such a setting method is advantageous, compared to welding, in that it allows a very large number of bonds to be made simultaneously, for example in the case of a stack of components.

Alternatively or in addition to a thermal setting adhesive, it is possible to use an adhesive that sets by any means or energy. This is the case with a photosensitive adhesive whose setting is triggered by light radiation, such as UV light. Setting over time is also possible.

As described above, the purpose of the quick-setting adhesive means 4 is to immobilize the first component 1 relative to the second component 2. Its deposition can also be punctual, and for example, limited to at least two points.

Like the slow-setting adhesive means 3, the quick-setting adhesive means 4 comprises a quick-setting adhesive. Alternatively or additionally, it comprises a double-sided adhesive, i.e. a surface support coated on both sides with a quick-setting adhesive.

In all cases, the quick-setting adhesive can be a solid, liquid or paste, applied by brush, syringe, silk-screen printing, transfer, spray or any other means. The quick-setting adhesive is preferably of the press-activated, instant-setting type. According to one embodiment, the sticky active ingredient is contained in microcapsules that are punctured by pressing the two components 1, 2 together. The active ingredient dries immediately after its release by puncturing the microcapsules.

The invention further relates to an assembly obtained by means of such a bonding method.

The above bonding method can be applied to the manufacture of a fuel cell 7 in at least two interfaces: for the assembly of a bipolar plate 6 and for the assembly of a bipolar plate with a membrane plate 15.

Figure 3:
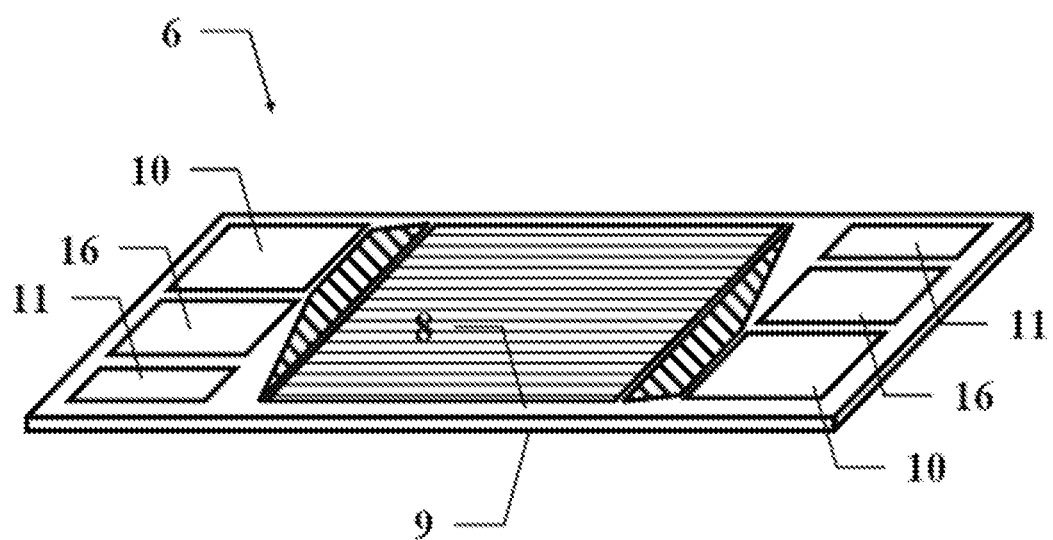
FIG. 3 represents, in perspective view, a bipolar plate.
Figure 4:
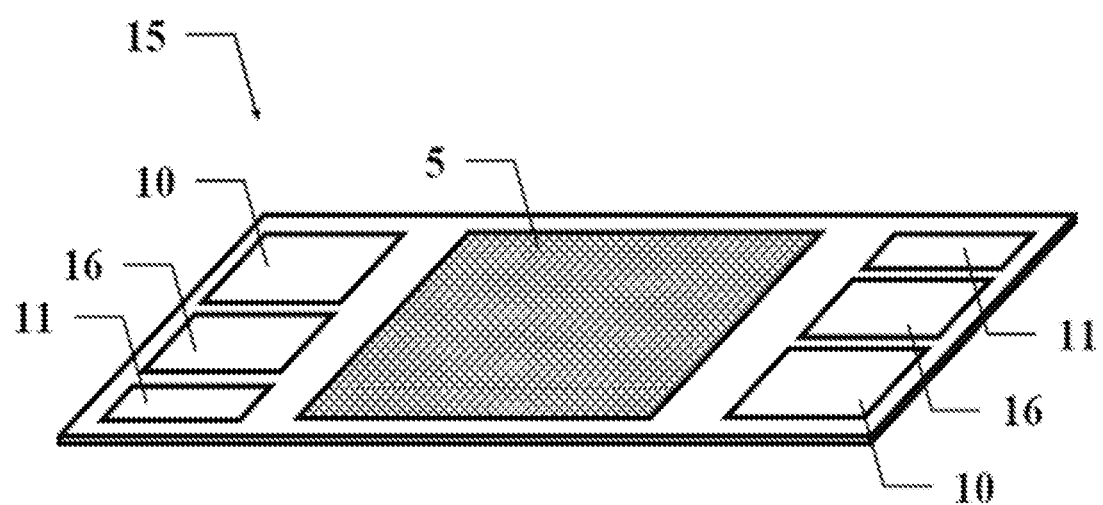
FIG. 4 represents, in a perspective view, a membrane plate.

For the record, a bipolar plate 6 for a fuel cell 7 comprises an anode plate 8 and a cathode plate 9, which are substantially superposable and assembled back-to-back. A fuel cell is composed of a stack of cells each comprising a cathode plate 9, a membrane plate 15 comprising a membrane electrode assembly 5 and an anode plate 8, and then the periodic pattern is repeated with a new cathode plate 9. Both the cathode plate 9 and the anode plate 8 are metallic. It is therefore advantageous to pre-assemble the anode plate 8 of one cell with the cathode plate 9 of the next cell. This pre-assembly is called bipolar plate 6. Such a bipolar plate 6 is shown in FIG. 3. This pre-assembly advantageously applies a bonding method according to one of the preceding embodiments to assemble an anode plate 8 with a cathode plate 9. Thus, advantageously immobilized by the quick-setting adhesive means 4, the pre-assembly can be handled without fear to typically make a fuel cell 7. In this particular case, the setting of the slow-setting adhesive means 3 can advantageously be delayed to be carried out at the same time as the setting of other assemblies, in a single operation.

Figure 6:
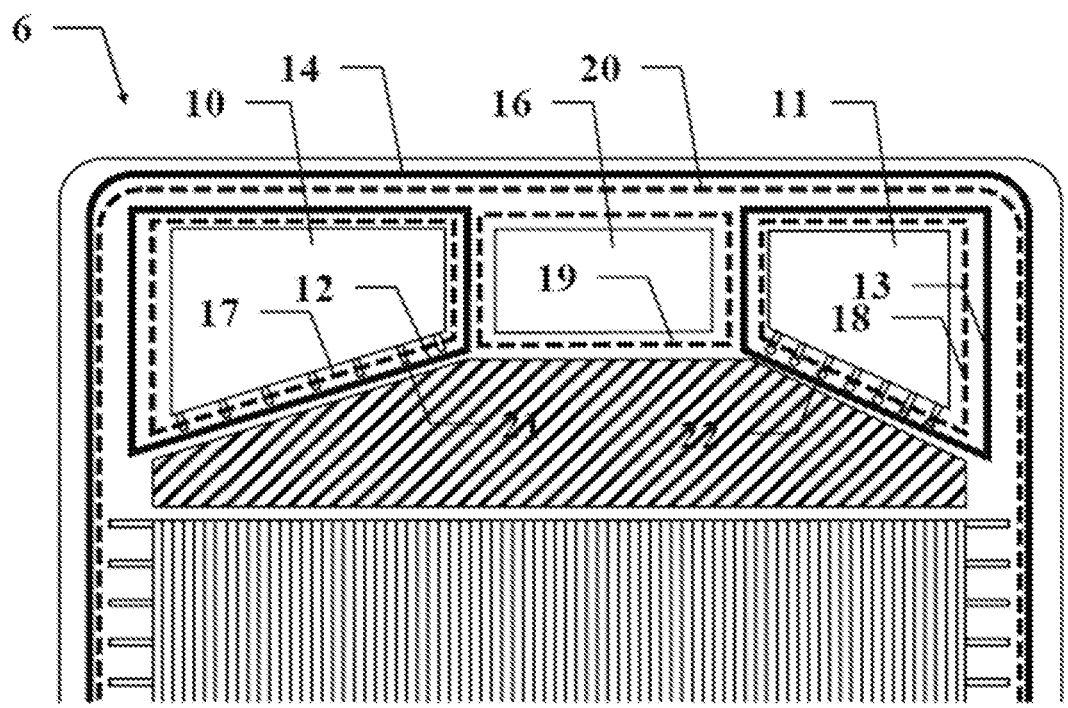
FIG. 6 represents in a front view, a half plate.
Figure 7:
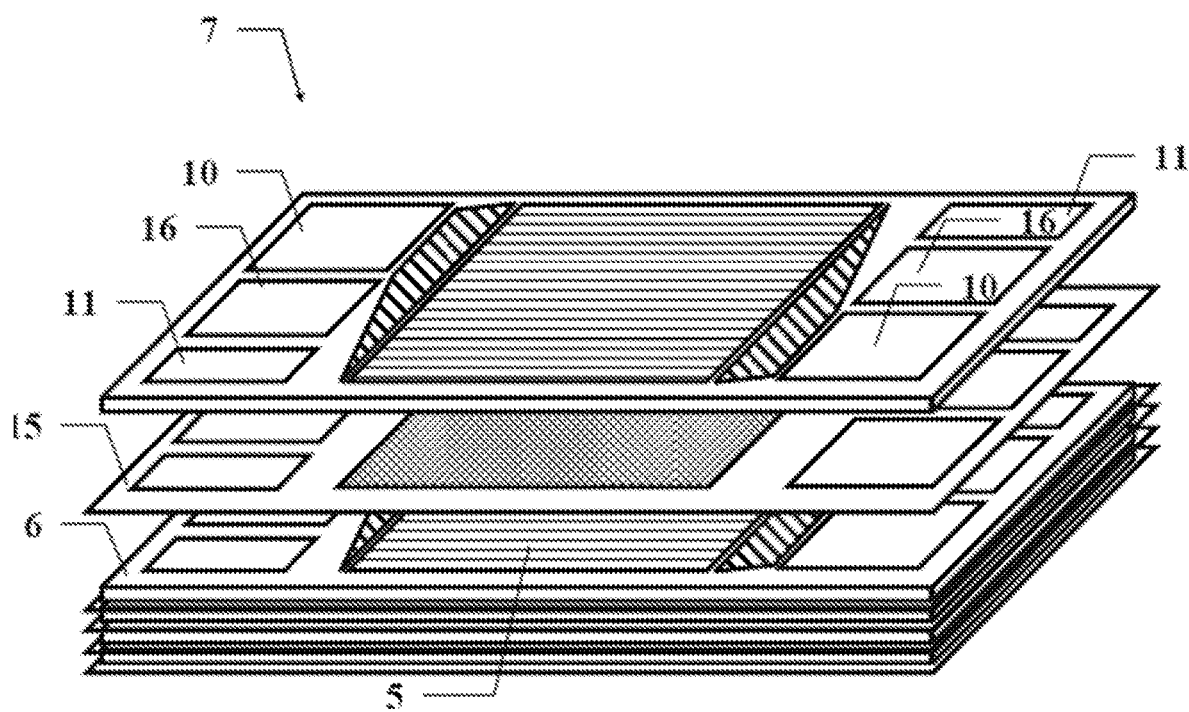
FIG. 7 represents in a perspective view, a fuel cell.

As a reminder, according to an advantageous embodiment, visible in FIGS. 3, 6 and 7, the anode plate 8 and the cathode plate 9 are pierced with openings 10, 11 facing each other, so as to form through-flowing gaseous reagent channels, perpendicular to the plane of the plates 8, 9. Thus the opening 10 forms a channel in which air circulates, while the opening 11 forms a channel in which hydrogen circulates. In each anode plate 8 there are lines 21 connecting the opening 10 to the anode itself, located in the center of the anode plate 8. Similarly, in each cathode plate 9 there are lines 22 connecting the opening 11 to the cathode itself, located in the center of the cathode plate 9.

A first opening 10, located on the left side of the anode plate 8, allows the air to enter the anode to supply the reaction with oxygen, a second opening 10, located on the right side of the anode plate 8, allows the exit and the recycling of the unused air and the water produced by the reaction. A first opening 11, located to the right of the cathode plate 9 allows the entry of hydrogen to the cathode to feed the reaction in hydrogen, a second opening 11, located to the left of the cathode plate 9 allows the exit and the recycling of the unused hydrogen.

The openings 10 do not communicate with the cathode. The openings 11 do not communicate with the anode.

It is therefore necessary to ensure a gas seal between the different circuits or with the outside. The slow-setting adhesive 3 is used to create these seals. It is applied in several continuous, closed contours. Thus, as illustrated in FIG. 6 for a symmetrical half-plate, considering the contours shown in a continuous line, a contour 12 surrounds an opening 10, a contour 13 surrounds an opening 11, in such a way that the gas circulating in the openings 10, 11 can only leave it through the dedicated lines 21, 22. A further seal is ensured on the common periphery of the plates 8, 9 according to a continuous and closed contour 14 arranged along the periphery of the plates 8, 9.

The invention also relates to a bipolar plate 6 obtained by such an assembly method.

For the record, according to an advantageous embodiment, visible in FIGS. 6 and 7, a fuel cell 7 comprises a stack periodically alternating a bipolar plate 6 and a membrane plate 15. As shown in FIG. 7, a bipolar plate 6 is arranged, for example with the anode plate 8 facing upwards, in order to provide an anode for the cell. A membrane plate 15, incorporating a membrane electrode assembly 5 is then arranged on top, to provide a membrane electrode assembly to the cell. A new bipolar plate 6 is arranged on top, oriented in the same direction, i.e. the cathode plate 9 downwards, in order to provide a cathode to the cell. Thus a cell is formed. The upper bipolar plate 6 comprises an anode for the next cell. The two end plates of the stack are different to complete the stack and to allow the connection of the networks (air, hydrogen and cooling fluid) to the lines.

It is assumed that the bipolar plates 6 are already pre-assembled. It is appropriate to carry out the assembly between a bipolar plate 6 (anode side) and a membrane plate 15 as well as between a membrane plate 15 and a bipolar plate 6 (cathode side). For this purpose, a bonding method according to one of the preceding embodiments can advantageously be applied to join a bipolar plate 6 with a membrane plate 15.

Figure 5:
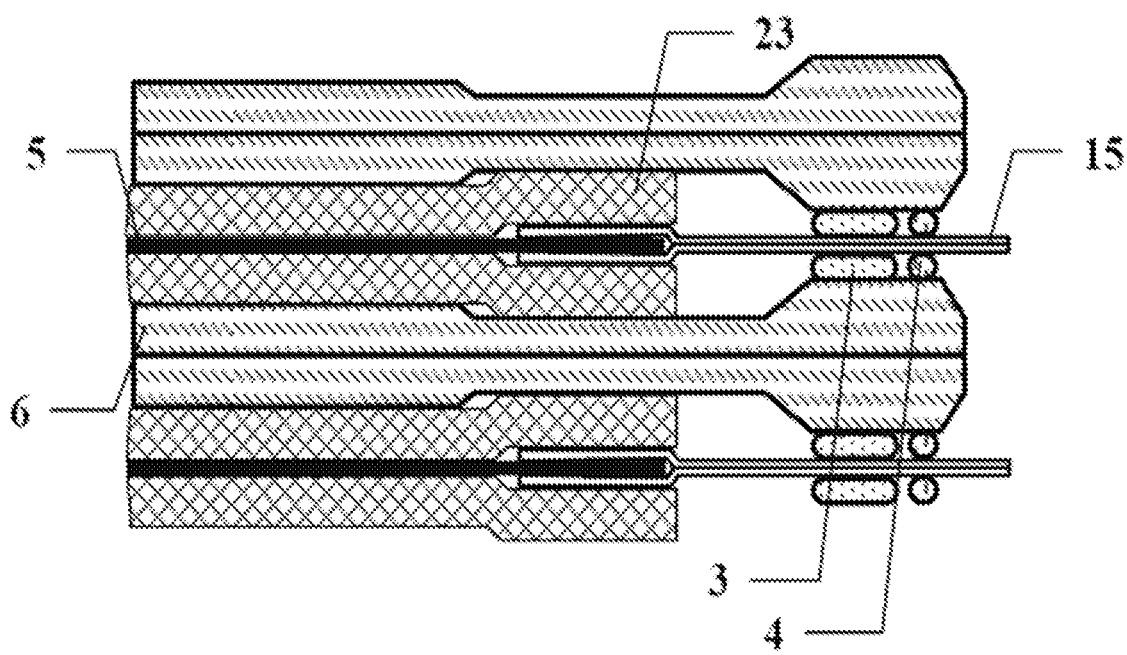
FIG. 5 represents in a profile view, an assembly between a bipolar plate and a membrane plate.

FIG. 5 shows in a side view, the interface between a membrane plate 15 and a bipolar plate 6. In the center of the membrane plate 15 is integrated a membrane electrode assembly 5. This latter comprises, on both sides, two layers 23 ensuring the functions of diffusion of the reactive gases and of the catalyst.

As a reminder, according to an advantageous embodiment, visible in FIGS. 3, 4, 6 and 7, the bipolar plate 6 and the membrane plate 15 are pierced with opposing openings 10, 11, so as to form through channels for gaseous reagents and are also pierced with opposing openings 16, so as to form through channels for cooling fluid. Thus the opening 16 forms a channel through which a cooling fluid flows. The said fluid remains confined to the opening 16 and must not spread to the rest of the plate 6, 15.

It is therefore necessary to ensure a gas seal between the different circuits or with the outside, as well as the containment of the cooling fluid. The slow-setting adhesive means 3 is used to create these seals. It is applied in several continuous, closed contours. Thus, as shown in FIG. 6 for a symmetrical half-plate, considering the dotted contours, a contour 17 surrounds an opening 10, a contour 18 surrounds an opening 11 and a contour 19 surrounds an opening 16. A further seal is provided on the common periphery of the plates 6, 15 according to a continuous, closed contour 20 arranged along the periphery of the plates 6, 15.

The invention further relates to a fuel cell 7 obtained by means of such an assembly method.

The invention has been illustrated and described in detail in the drawings and the preceding description. The latter should be considered as illustrative and given as an example and not as limiting the invention to this description alone. Many alternative embodiments are possible.

LIST OF REFERENCE SIGNS

1: component 1,
2: component 2,
3: slow-setting adhesive means,
4: quick-setting adhesive means,
5: membrane electrode assembly,
6: bipolar plate,
7: fuel cell,
8: anode plate,
9: cathode plate,
10: air opening,
11: hydrogen opening,
12: contour of 10,
13: contour of 11,
14: peripheral contour,
15: membrane plate,
16: cooling fluid opening,
17: contour of 10,
18: contour of 11,
19: contour of 16,
20: peripheral contour,
21: air line,
22: hydrogen line,
23: diffusion layer and catalyst.

The invention claimed is:

1. An assembling method for assembling a bipolar plate for a fuel cell, comprising an anode plate and a cathode plate, which are superposable, wherein it applies a bonding method comprising the following steps:
   providing a slow-setting adhesive and a quick-setting adhesive wherein the slow-setting adhesive is configured to have a slower setting than a quick-setting of the quick-setting adhesive,
   depositing on the anode plate and/or the cathode plate an adhesive of a first type, from among the slow-setting adhesive or the quick-setting adhesive,
   depositing on the anode plate and/or the cathode plate an adhesive of a second type, different from the first type, among the slow-setting adhesive or the quick-setting adhesive,
   bringing the two plates into contact,
   pressing and
   setting of the slow-setting adhesive
   to assemble the anode plate with the cathode plate.

2. The assembling method according to claim 1, wherein the anode plate and the cathode plate are pierced with facing openings, so as to form continuous gaseous reagent channels, and wherein the slow-setting adhesive is deposited in a continuous, closed contour surrounding each of the openings and according to a continuous, closed contour at the periphery of the plates.

3. A bipolar plate obtained by means of an assembling method according to claim 1.

4. An assembling method for assembling a fuel cell, comprising a stack periodically alternating a bipolar plate and a membrane plate, the bipolar plates all being oriented in the same direction, wherein it applies a bonding method comprising the following steps:
   providing a slow-setting adhesive and a quick-setting adhesive wherein the slow-setting adhesive is configured to have a slower setting than a quick-setting of the quick-setting adhesive,
   depositing on the bipolar plate and/or the membrane plate an adhesive of a first type, from among the slow-setting adhesive or the quick-setting adhesive,
   depositing on the bipolar plate and/or the membrane plate an adhesive of a second type, different from the first type, among the slow-setting adhesive or the quick-setting adhesive,
   bringing the two plates into contact,
   pressing and
   setting of the slow-setting adhesive
   to assemble the bipolar plate with the membrane plate.

5. The assembling method according to claim 4, wherein the bipolar plate and the membrane plate are pierced with facing openings, so as to form gaseous reagent channels and at least one flow-through cooling fluid line, and wherein the slow-setting adhesive is deposited according to a continuous, closed contour surrounding each of the openings, and according to a continuous, closed contour at the periphery of the plates.

6. A fuel cell obtained by means of an assembly method according to claim 4.

* * * * *